May 4, 1937.  J. M. CHRISTMAN  2,078,931
MOTOR VEHICLE
Filed March 16, 1933   3 Sheets-Sheet 1
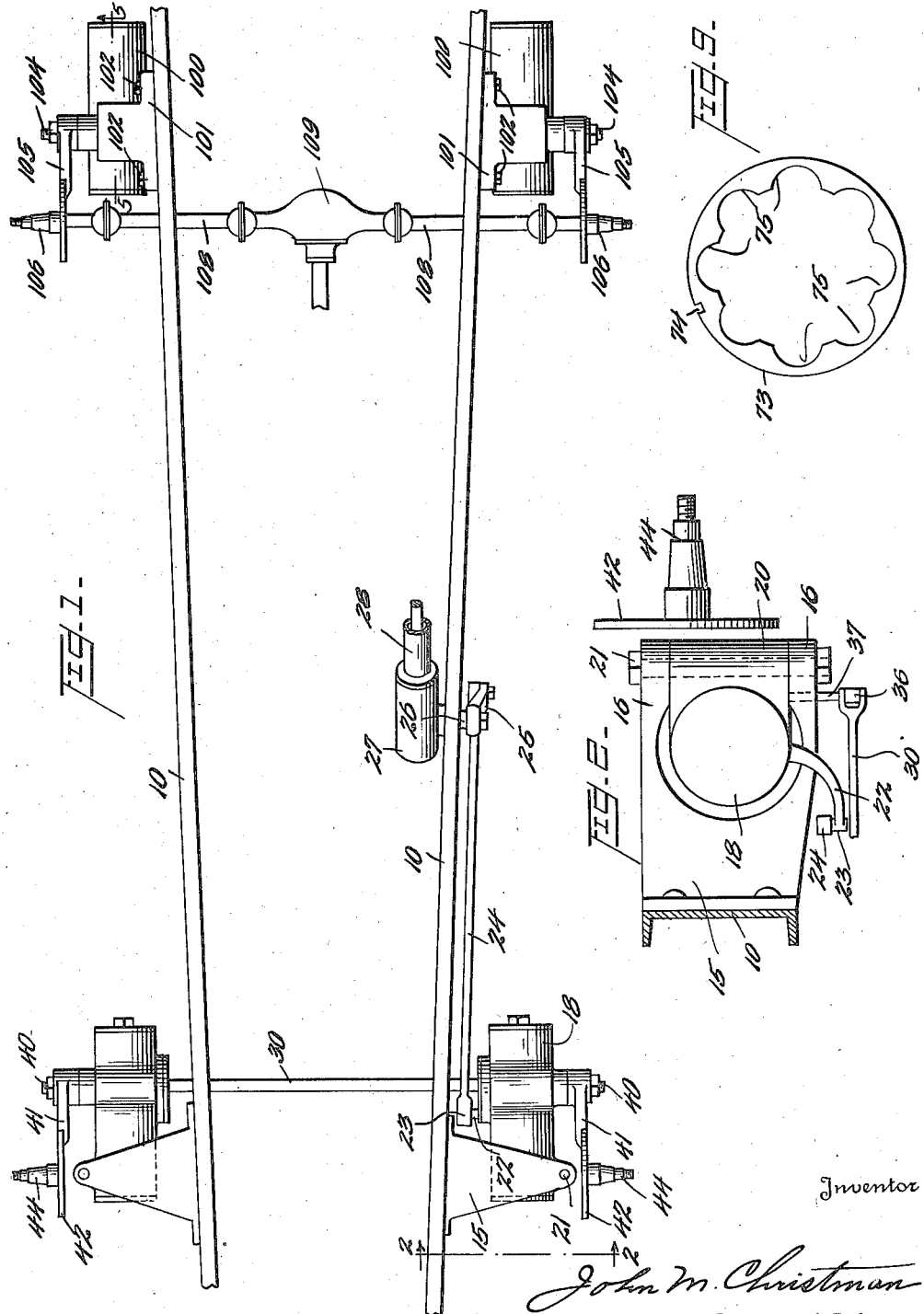
Inventor
John M. Christman
By Watson, Coit, Morse & Grindle
Attorney May 4, 1937.   J. M. CHRISTMAN   2,078,931
MOTOR VEHICLE
Filed March 16, 1933   3 Sheets-Sheet 2
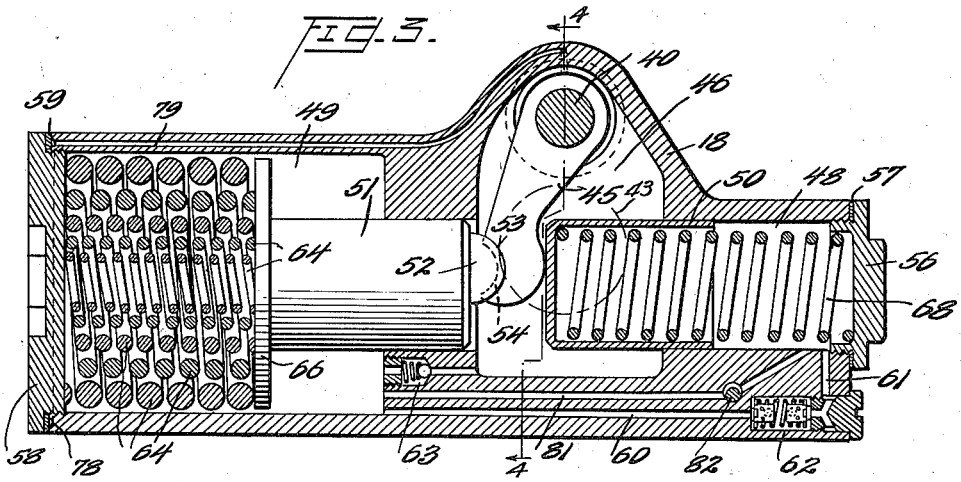
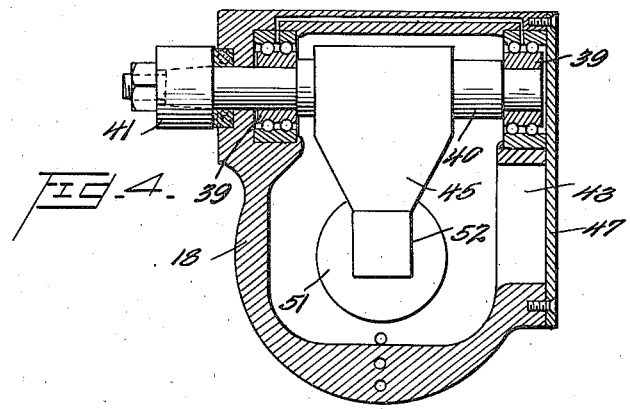
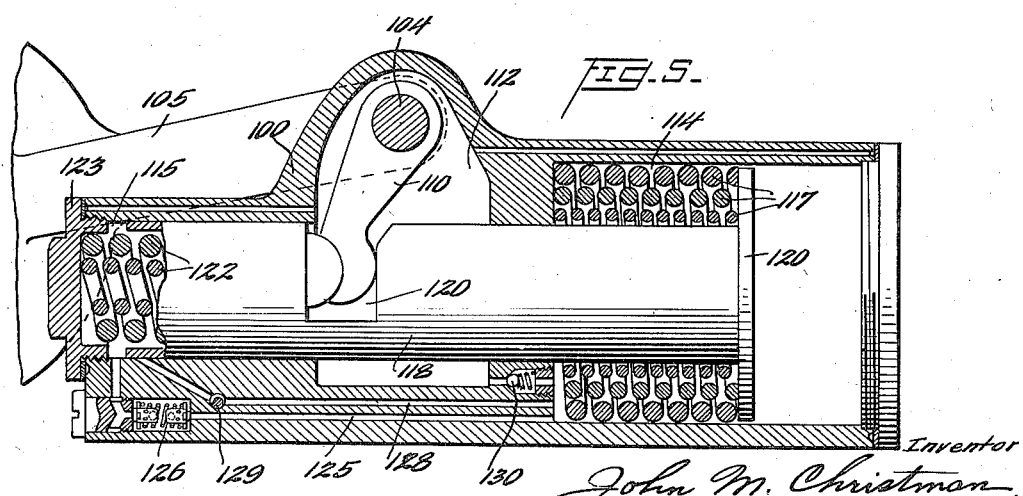
Inventor
John M. Christman
By Watson, Coit, Morse + Grindle
Attorney

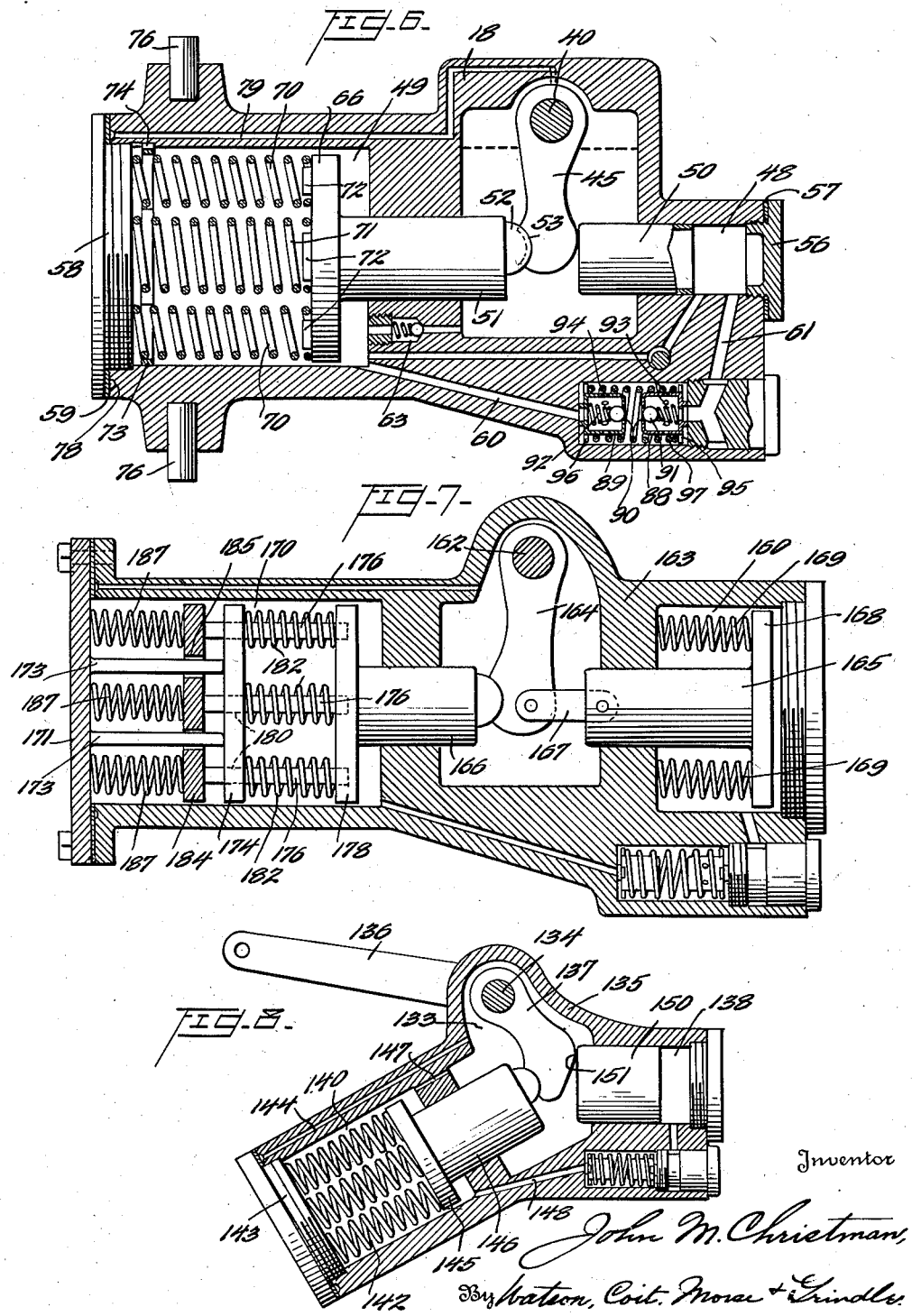

Patented May 4, 1937

2,078,931

UNITED STATES PATENT OFFICE 2,078,931

MOTOR VEHICLE

John M. Christman, Detroit, Mich., assignor to Packard Motor Car Company, Detroit, Mich., a corporation of Michigan Application March 16, 1933, Serial No. 661,128

22 Claims. (Cl. 267—20)

This invention relates to motor vehicles and more particularly to improvements in vehicles of the type in which the road wheels are independently sprung. It is the principal object of the invention to provide wheel supporting structure which will improve the riding qualities of the vehicle and which will effect the utmost economy in the space required and in the cost of production.

Thus it is a feature of the invention that the individual support for each wheel comprises not only yielding means of adequate strength to carry the vehicle load but also embodies shock absorbing structure, each support constituting a compact and readily serviceable unit.

It is a further object of the invention to provide a combined shock absorber and spring suspension for the steerable road wheels which may be readily supported for swinging steering movement directly on the vehicle frame so that the steering mechanism may also be supported by the frame and will thus partake of no relative movement in response to relative vertical movement of the road wheels and frame. It is also an object of the invention to provide a shock absorber and spring suspension which will function in a somewhat different manner on the occurrence of a sudden or violent shock in order to prevent damage to the working parts thereof.

The improved shock absorber disclosed herein is of the fluid type and is so designed as to reduce the possibility of leakage of fluid therefrom to a minimum. It is a feature of the invention that the shock absorber and spring suspension unit as applied to the steerable road wheels functions as a steering knuckle in order that saving in space may be effected without necessarily restricting the number, size, or preferred arrangement of the springs employed to yieldingly suspend the vehicle frame on the road wheels, and that the unit applied to the rear vehicle wheels is constructed so as to readily accommodate the driving shafts for these wheels.

Further objects and features of the invention will be apparent from the following description taken in connection with the accompanying drawings, in which:

Figure 1 is a plan view of a motor vehicle chassis showing the application of the principles of the invention thereto;

Figure 2 is a transverse view partly in section on the line 2—2 of Figure 1;

Figure 3 is a longitudinal section through one form of shock absorber unit;

Figure 4 is a section on the line 4—4 of Figure 3;

Figure 5 is a longitudinal sectional view of a shock asborber taken on the line 5—5 of Figure 1;

Figures 6 to 8 are longitudinal sectional views illustrating modified forms of shock absorber unit; and Figure 9 is an elevation of a spring retaining element for use in the modification shown in Figure 6.

In order to facilitate an understanding of the invention, specific language is used herein to describe the several modified forms thereof illustrated in the drawings, but it will be understood that no limitation of the invention is intended by the use of detailed descriptive language and that various alterations of the several modifications illustrated herein may be made without departing from the invention.

Referring to Figure 1 of the drawings, it will be seen that a vehicle frame is represented by the usual side frame members 10, the remaining portions of the frame being omitted since the specific construction thereof is a matter of no importance so far as the present invention is concerned.

Adjacent the forward end of the frame and secured rigidly to the side frame members 10 at each side of the vehicle are brackets 15. Each of these brackets constitutes a support on which a steering knuckle or its equivalent may be mounted. For instance as shown in Figure 2 of the drawings, the bracket may be formed to provide forked arms 16 adapted to embrace a portion of a substantially cylindrical shock absorber housing 18, the latter being formed to provide a laterally extending boss 20 and a king pin or its equivalent 21 being passed through the forked arms 16 of the bracket and through the boss 20.

It is quite apparent that in practice conventional knuckle and king pin construction may be employed, and that the axis of swinging movement of the knuckle on the bracket 15 may be inclined to the vertical to afford the usual caster effect. A simplified construction is shown in the drawings, however, to facilitate an understanding of the invention, and it will be understood that the term "steering knuckle" as used herein is intended to apply to any member adapted to carry the vehicle road wheel and supported for movement in a substantially horizontal plane, so that the vehicle may be steered by such movement.

In order that steering movement may be imparted to the steering knuckle represented by the housing 18 of the shock absorber, a steering arm 22 may be formed on or secured to the lower side of the housing and extend inwardly therefrom, this arm being pivotally connected as at 23 to a drag link 24, the latter being in turn pivotally connected with an arm 25 carried by a shaft 26 extending through the side frame member 10 and communicating with gearing within a steering gear housing 27, the latter being disposed at the lower end of the steering column 28 and being operable from the usual steering hand wheel (not shown).

A cross tie rod 30 is also provided to connect the housings or knuckles 18 at opposite sides of the vehicle for synchronous steering movement, for instance the rod 30 may be pivotally connected as indicated at 36 to an arm 37 depending from the lower side of each housing 18.

It will be seen from the construction thus far described that on operation of the usual steering hand wheel, both the housings 18 will be swung in a substantially horizontal plane, and since a wheel assembly is carried by each of these housings as hereinafter described, the vehicle may be readily steered, it being noted that all of the steering connections are carried directly by the vehicle frame and are therefore subject to no displacement when an obstruction is encountered by the road wheels.

A shaft 40 is journalled for rotation in each housing 18 and extends laterally thereof, a wheel carrying arm 41 being secured to or formed integrally with the shaft adjacent its outer end. The arm 41 extends forwardly and merges with a disk 42 adapted to support the usual brake backing plate, and a wheel spindle 44 extends laterally from the disk and is constructed to afford a support for the usual vehicle wheel which is rotatably mounted thereon in the conventional manner.

When an obstruction is encountered by either of the steerable road wheels, the wheel and the wheel carrying arm 41 associated therewith will be swung upwardly about the axis of the shaft 40 and will rotate the latter, means being provided within the housing 18 for yieldingly resisting the rotation of the shaft 40 and thereby the upward movement of the road wheel. In addition to this yielding means, provision is made for adequately resisting sudden shock and excessive relative accelerative movement of the road wheel and the vehicle frame in a vertical direction.

One such arrangement is shown in Figure 3 of the drawings in which the shaft 40 is illustrated as provided with an arm 45 rigidly secured thereto and depending within a chamber 46 formed within the housing 18.

In order that the shaft 40 and the arm 45 may be readily inserted in the housing 18, the inner side of the latter is provided with an opening 43 of suitable configuration which may be closed by means of a plate 47 secured against the inner face of the housing.

On either side of the chamber 46 the housing 18 is provided with opposed cylinders 48 and 49 in which pistons 50 and 51 are respectively supported for reciprocation. The piston 51 is preferably provided at its inner end with a lug 52 which may have flattened sides and a curved peripheral portion 53, this lug being received in a recess 54 in the lower end of the arm 45, to provide the bearing surface of considerable area between the arm and the piston. The piston 50 may be similarly constructed for engagement with the arm 45 or may, as shown in the drawings, merely contact with the arm.

The cylinder 48 is closed by means of a threaded element 56 provided with a suitable gasket 57 to seal the cylinder, and the outer end of the cylinder 49 is likewise closed by a threaded element 58 supplied with a gasket 59. The cylinders 48 and 49 are placed in restricted communication by means of passages 60 and 61, these passages leading to opposite ends of a valve chamber 62 having means therein for restricting the flow of liquid as hereinafter described. The cylinder 49 also communicates with the chamber 46 by means of a one-way valve indicated generally at 63, this valve permitting passage of fluid from the chamber 46 to the cylinder 49 but preventing withdrawal of fluid from the cylinder. Thus the chamber 46 may serve as a supply reservoir so that when leakage occurs in the fluid system including the cylinders 48 and 49 and the connecting passages 60 and 61, the fluid will be automatically replenished by the partial vacuum developed in the cylinder 49 on movement of the piston 51 to the right as shown in Figure 3 of the drawings.

One or more coil springs 64, which may be telescoped as shown in the drawings, are located within the cylinder 49 and are arranged to be compressed between a substantially annular flanged portion 66 formed on the outer end of the piston and the element 58 which serves to close the outer end of the cylinder. One or more coiled springs 68 are also introduced in the cylinder 48 and act between the piston 50 and the outer end of the cylinder.

It will thus be observed that when an obstruction is encountered by the road wheel, the shaft 40 is rotated in a clockwise direction to force the piston 51 into the cylinder 49, causing flow of fluid from the cylinder 49 through the passages 60 and 61 into the cylinder 48, and also compressing the springs 64. On reverse rotation of the shaft 40, the springs 68 are compressed and the fluid is forced from the cylinder 48 into the cylinder 49 through the restricted passage. Since upward movement of the road wheel results in expulsion of fluid from the cylinder 49 and compression of the springs therein, this cylinder may be conveniently referred to as the compression cylinder, whereas the cylinder 48 may be described as a rebound cylinder. That portion of the vehicle load which is supported by one of the road wheels is carried by the multiplicity of springs 64 in the shock absorbing device associated with the wheel, the springs 68 merely acting to retain the piston 50 in engagement with the arm 45.

It is convenient to refer here to Figure 6 of the drawings illustrating a modified construction which is identical in most respects, permitting the use of similar reference numerals. The coil springs 70, however, are circumferentially disposed about a centrally located coil spring 71, and each spring is retained in position against lateral displacement by means of a stud 72 formed on the outer face of the annular portion 66 of the piston 51. At the outer end of the cylinder 49, a member 73, shown in detail in Figure 9, having a circular periphery fitting within the wall of the cylinder 49 and keyed or otherwise secured thereto as indicated at 74 is provided with a plurality of cut-away portions 75 each adapted to partially embrace one of the coil springs 70 to retain the latter in proper position while the threaded element 58 is being applied in order to facilitate assembly of the springs. The housing 18 is illustrated in Figure 6 as provided with oppositely disposed pins 76 which may serve to pivotally support the housing in the bracket 15 for swinging steering movement.

There is one other feature of difference between the constructions illustrated in Figure 3 and Figure 6 in that the latter employs no spring for retaining the piston 50 in engagement with the arm 45, the piston 50 being of slightly less diameter than the piston 51. By this expedient the fluid driven out of the compression cylinder 49 as the piston 51 is moved to the left will be of slightly greater volume than the additional capacity afforded in the cylinder 48 as the piston 50 moves an equal distance to the left, and thus an excess of pressure will be established in the cylinder 48 maintaining the piston 50 in abutting relation with the lever 45 during the compression or upward movement of the vehicle wheel. On downward movement of the vehicle wheel resulting in movement of pistons 50 and 51 to the right, any substantial reduction of pressure in the cylinder 49 resulting from the difference in size of the two pistons and the failure of delivery of an adequate supply of fluid from the cylinder 48 to the cylinder 49 will result in withdrawal of additional fluid from the supply chamber 46 through the one-way valve 63, and thus adequate pressure is maintained at all times in the fluid system.

Referring now to the valve located within the valve chamber 62 and shown in more detail in Figure 6 of the drawings, it will be observed that two substantially cup-shaped valve elements 88 and 89 are provided, each of these elements being formed at its inner end with an opening 90 normally closed by a member 91 yieldingly seated by means of a coil spring 92. The elements 88 and 89 are provided with restricted orifices 93 and 94 to permit passage of fluid therethrough and are also provided with flanged portions 95 and 96 which serve as abutments for a relatively stiff coil spring 97, the latter serving to retain the elements 88 and 89 in position in engagement with the end walls of the valve chamber. The flanged portions 95 and 96 of the valve elements also serve as guides for the valve elements and are preferably interrupted to provide passages for fluid about a considerable portion of the circumference thereof.

Each of the valve elements 88 and 89, which are of the general character shown in my copending application Ser. No. 587,539, is normally seated at the opposite ends of the valve chambers by the action of the coil spring 97 so that fluid moving from the compression cylinder to the rebound cylinder is forced to pass through the orifice 94 in the valve element 89 and fluid moving from the rebound cylinder to the compression cylinder flows through the orifice 93 in the valve element 88, the members 91 yielding in opposite directions to permit the flow of fluid thereby, so that the orifices 93 and 94 will not function in series and may be of different size. This is desirable since it is obvious that the conditions of operation of the pistons within the rebound and within the compression cylinders are different, and as a general rule less resistance should be offered to the flow of fluid from the compression cylinders.

It will be seen that when excessive vertical acceleration of a vehicle road wheel occurs, pressures may be developed within the compression cylinders which will reach dangerous proportions and which may cause the pistons to seize by the expansive force applied thereto. In order to relieve such excessive and unusual pressures, the valve element 89 is permitted to move from its seat at the associated end of the valve chamber. The fluid path through the orifice 94 is thus by-passed, and fluid is allowed to flow through the interrupted flange portion 96 as well, the coil spring 97 being sufficiently strong to resist this movement except in response to abnormally high pressure. While the same movement may be imparted to the valve elements 88 on the development of abnormal pressure in the rebound cylinders, such pressures are seldom or never developed in practice.

In view of the fact that extremely high pressures may be developed in the cylinder 49 momentarily, for instance when the road wheel encounters an obstruction, provision should be made to prevent the discharge of fluid past the gasket 59 at the outer end of the cylinder. For this purpose an annular recess 78 is formed in the outer face of the cylinder wall to form with the gasket 59 a pocket completely surrounding the cylinder. This annular recess is connected by means of a passage 79 with the chamber 46 and thus the pressure on the gasket is relieved, any oil forced past the inner circumference of the gasket being discharged through the annular recess 78 and the passage 79 into the supply chamber 46, preferably adjacent the bearings 39 for the shaft 40, in order that adequate lubrication for these bearings may be assured.

It will also be observed that this arrangement serves to bleed air which might otherwise be pocketed in the cylinder, and thus the same provision may be made for the rebound cylinders, particularly where the construction is such that air pockets may readily develop therein, for instance as in the modification shown in Figure 5 of the drawings and described hereinafter.

The cylinders 48 and 49 are preferably connected by a passage 81, within which is located a valve 82 which may be manually controlled, preferably from the instrument board of the vehicle. It will be observed that the passage 81 serves as a by-pass for the passages 61 and 62. Thus the degree of resistance offered to flow of fluid from one cylinder to the other may be varied at will by regulation of the valve 82, and the riding qualities of the vehicle accordingly controlled to suit the convenience of the driver.

Returning to Figure 1 of the drawings, it will be observed that since the rear wheels are not used for steering purposes, the shock absorber housing 100 may be supported rigidly on the vehicle frame, for instance the housing may be formed to provide a flanged portion 101 which may be bolted or otherwise secured to the side frame member as indicated at 102. A rotatable shaft 104 journaled within the housing 100 carries the wheel supporting arm 105 from which projects laterally a wheel carrying spindle 106 on which the road wheel is journaled. So far as the elements of the shock absorber and spring suspension within the housing 100 are concerned, these may be identical with that described for use with the front wheel of the vehicle, except that provision must be made to accommodate the flexible or universally jointed shafts 108 extending laterally from the differential gearing housing 109 and serving to drive the rear road wheels. It will be understood that the shafts 108 or extensions thereof pass through the interior of the wheel spindles 106 and are connected to the road wheels outwardly of the latter in the conventional manner, this construction being well understood and forming no part of the present invention.

In order to provide clearance for the drive shafts 108, the construction illustrated in Figure 5 of the drawings may be adopted in which the major portion of the housing 100 extends to the rear of the shaft 104. Thus the arm 110 carried by the shaft 104 operates within a fluid supply chamber 112, and the housing is further formed to provide two cylinders 114 and 115 leading from the supply chamber, the cylinder 114 being of considerably greater capacity than the cylinder 115 to accommodate the nested coil springs 117 which serve as the principal support for the vehicle load. The springs 117 are placed under compression by movement of the piston 118 to the left, the latter being provided with an annular flanged portion 120 engaging the springs. In this form of the invention the piston 118 is shown as extending also within the cylinder 115 and serving in effect as two separate pistons, the central portion of the piston being slotted as indicated at 120 to receive the lower end of the arm 110 therein.

That portion of the piston which extends within the cylinder 115 is hollow and receives therein a plurality of coil springs 122 which are similarly nested and which are compressed between the piston and an element 123 which serves to close the outer end of the cylinder 115 and which may be threaded therein. The springs 122 thus assist the springs 117 in carrying the vehicle load but occupy less space than the latter so that the flexible drive shafts 108 may be readily accommodated.

As in the forms of the invention heretofore described, the cylinders 114 and 115 are preferably connected by means of a passage 125 having a relief valve 126 disposed therein and functioning to restrict flow of fluid through the passage 125, this relief valve also functioning to permit greater flow as hereinbefore explained when excessive pressures are developed in the compression cylinder 115. The passage 125 is by-passed by means of a duct 128 having a manually operable valve therein so that the action of the shock absorber may be readily controlled by the driver, and a one-way valve 130 functions to deliver fluid from the supply chamber 112 to the cylinders on the occurrence of leakage from the cylinders and the associated system.

An alternative arrangement for use in supporting the rear vehicle wheels is shown in Figure 8 of the drawings in which the shaft 134 journaled in the housing 135 is provided with a wheel supporting arm 136 rigidly secured thereto and with an arm 137 depending within the supply chamber 133 of the housing. The housing is formed to provide cylinders 138 and 140, the latter functioning as a compression cylinder and extending angularly with respect to the rebound cylinder 138 so that the drive shaft for the rear wheel may readily pass above the cylinder 140 without interference therewith. In this form of the invention springs 142 are interposed between a closure element 143 for the outer end of the cylinder 140 and a flanged portion 145 on the piston 146 which operates within the cylinder and which engages and is actuated by the arm 137.

Since the passage 144 serving to prevent the forcing of fluid from the outer end of the cylinder 140 will obviously not serve to effectively bleed air from the cylinder, a small bleed passage 147 communicating with the supply chamber 133 and the cylinder 140 is preferably provided for this purpose.

The usual restricted passage 148 affords communication between the cylinders 140 and 138, a piston 150 reciprocating in the latter and being engaged by a portion 151 of the arm 137 which is formed as an involute curve for rolling engagement with the end of the piston 150, this being desirable in view of the angular relation between the axes of the cylinders and the disposition of the shaft 134 with respect to these cylinders. Springs need not be provided in the cylinder 138, the relative size of the pistons 146 and 150 being proportioned as hereinbefore explained so as to ensure maintenance of the piston 150 in engagement with the arm 137.

The modified form of the invention shown in Figure 7 of the drawings functions similarly to those described hereinbefore, differing principally in the arrangement of the springs which afford support for the vehicle load. Thus the shaft 162 journaled within the housing 163 carries the arm 164 which serves to actuate the rebound and compression pistons 165 and 166 operating in the cylinders 160 and 170 respectively, a link 167 serving to connect the arm 164 to the piston 165.

The piston 165 is provided with a flanged portion 168 which serves to compress a plurality of circumferentially disposed coil springs 169 located within the cylinder 160 on movement of the piston to the left.

The outer end of the compression cylinder 170 is preferably closed by means of a plate 171 having upstanding lugs 173 formed thereon, these lugs serving as abutments for a plate 174. A plurality of pins 176 extending axially of the cylinder 170 and carried by an annular flanged portion 178 of the piston 166 extend loosely through openings 180 in the plate 174. Coil springs 182 surround the pins 176 and are interposed between the plate 174 and the flanged portion 178 of the piston. The outer ends of the pins 176 carry a plate 184 which is apertured as at 185 to permit the passage of the lugs 173 therethrough, coil springs 187 surrounding the lugs 173 being interposed between the closure member 171 and the plate 184.

It will be observed that by this construction a very considerable number of springs may be employed and these may be arranged in tandem, the arrangement being extended to include any number of series of coil springs in tandem, so that adequate yielding support for the vehicle load may be supplied within a relatively small unit.

In each of the modified forms of the invention shown herein it is proposed to connect the compression and rebound cylinders by a restricted passage offering resistance to the flow of fluid and preferably employing means such as that described hereinbefore for reducing the degree of resistance to flow when excessive pressure is developed in the compression cylinder. This arrangement has not been described specifically in connection with each modification. It is also important to note that in each of the modified forms of the invention the actuating shaft extending transversely of the shock absorber housing is positioned in the upper portion of the housing and may thus enter the housing above the level of fluid in the supply chamber to avoid unnecessary leakage of fluid therefrom. Furthermore, it will be appreciated that a device such as that shown in connection with the compression cylinders in the illustrated forms of the invention for preventing leakage of fluid at the outer ends of the compression cylinders may also be employed in connection with the rebound cylinders if desired.

Having thus described the invention, what is claimed as new and desired to be secured by Letters Patent is:

1. In a motor vehicle, the combination with a vehicle frame, of a road wheel, and means for yieldingly supporting said road wheel on said frame for substantially vertical movement with respect thereto, said means comprising a housing carried by said frame, said housing being formed to provide a fluid supply chamber and opposed fluid cylinders extending outwardly from said supply chamber, pistons operable in said cylinders, actuating means for said pistons extending within said supply chamber and operatively connected with said road wheel to support the latter, a restricted passage affording communication between said cylinders to provide therewith a fluid system, means including a one-way valve affording communication between said supply chamber and said fluid system to automatically replenish fluid in the latter, and a plurality of coil springs in one of said cylinders for urging the associated piston, piston actuating means, and road wheel in one direction.

2. In a motor vehicle, the combination with a vehicle frame, of a road wheel, and means for yieldingly supporting said road wheel on said frame for substantially vertical movement with respect thereto, said means comprising a housing carried by said frame, said housing being formed to provide a fluid supply chamber and opposed fluid cylinders extending outwardly from said supply chamber, pistons operable in said cylinders, actuating means for said pistons extending within said supply chamber and operatively connected with said road wheel to support the latter, a restricted passage affording communication between said cylinders to provide therewith a fluid system, said passage including a by-pass valve operable in response to excessive pressure within one of said cylinders to reduce the resistance to flow of fluid between said cylinders, means including a one-way valve affording communication between said supply chamber and said fluid system to automatically replenish fluid in the latter, and a plurality of coil springs in one of said cylinders for urging the associated piston, piston actuating means, and road wheel in one direction.

3. In a motor vehicle, the combination with a vehicle frame, of a road wheel, and means for yieldingly supporting said road wheel on said frame for substantially vertical movement with respect thereto, said means comprising a housing carried by said frame, said housing being formed to provide a fluid supply chamber and opposed fluid cylinders extending outwardly from said supply chamber, pistons operable in said cylinders, actuating means for said pistons extending within said supply chamber and operatively connected with said road wheel to support the latter, a restricted passage affording communication between said cylinders to provide therewith a fluid system, means including a one-way valve affording communication between said supply chamber and said fluid system to automatically replenish fluid in the latter, and a plurality of coil springs in one of said cylinders for urging the associated piston, piston actuating means, and road wheel in one direction, a closure member for one of said cylinders, and an annular passage between said cylinder and closure member for collecting fluid passing between the latter, said annular passage communicating with said supply chamber.

4. In a combined shock absorber and spring suspension for motor vehicles, the combination with a housing formed to provide a fluid supply chamber constituting a crankcase and opposed cylinders leading from said chamber, of pistons operating within said cylinders, actuating means for said pistons disposed within said supply chamber, means affording restricted communication between said cylinders and forming with the latter a fluid system, means for replenishing the supply of fluid in said system from said supply chamber, and a plurality of coil springs in one of said cylinders for resisting movement of the associated piston in one direction.

5. In a combined shock absorber and spring suspension for motor vehicles, the combination with a housing formed to provide a fluid supply chamber constituting a crankcase and opposed cylinders leading from said chamber, of pistons operating within said cylinders, actuating means for said pistons disposed within said supply chamber, means affording restricted communication between said cylinders and forming with the latter a fluid system, means for replenishing the supply of fluid in said system from said supply chamber, and a plurality of coil springs in one of said cylinders for resisting movement of the associated piston in one direction, said coil springs being arranged circumferentially about the axis of the cylinder in spaced relation.

6. In a combined shock absorber and spring suspension for motor vehicles, the combination with a housing formed to provide a fluid supply chamber constituting a crankcase and opposed cylinders leading from said chamber, of pistons operating within said cylinders, actuating means for said pistons disposed within said supply chamber, means affording restricted communication between said cylinders and forming with the latter a fluid system, means for replenishing the supply of fluid in said system from said supply chamber, and a plurality of coil springs in one of said cylinders for resisting movement of the associated piston in one direction, said coil springs being disposed in two series acting in tandem within the cylinder.

7. In a combined shock absorber and spring suspension for motor vehicles, the combination with a housing formed to provide a fluid supply chamber constituting a crankcase and opposed cylinders leading from said chamber, of pistons operating within said cylinders, actuating means for said pistons disposed within said supply chamber, means affording restricted communication between said cylinders and forming with the latter a fluid system, means for replenishing the supply of fluid in said system from said supply chamber, and a plurality of coil springs in one of said cylinders for resisting movement of the associated piston in one direction, said coil springs being disposed in two series acting in tandem within the cylinder, the springs in each series being circumferentially disposed about the axis of the cylinder.

8. In a spring device, the combination with a cylinder, of a piston operable in said cylinder, a closure member having threaded engagement with the outer end of the cylinder, coil springs disposed circumferentially about the cylinder and acting between said closure member and said piston, and an annular spring retaining member formed to partially encompass each of said springs and keyed against rotation with respect to the cylinder for maintaining said springs in spaced relation.

9. In a spring device, the combination with a cylinder, of a piston operable in said cylinder, a closure member having threaded engagement with the outer end of the cylinder, coil springs disposed circumferentially about the cylinder and acting between said closure member and said piston, and a separate spring retaining element keyed against rotation in the cylinder and engaging said springs to maintain the latter in spaced relation.

10. In a motor vehicle, the combination with a vehicle frame, of a housing supported on said frame, a shaft journalled in said housing, a driving road wheel supporting arm carried by said shaft and extending substantially horizontally therefrom, said housing being formed to provide cylinders on either side of said shaft, that cylinder adjacent the wheel supporting arm extending downwardly to afford clearance for driving connections to said road wheel, pistons within said cylinders operable by said shaft, fluid connections between said cylinders, and springs within said downwardly extending cylinder operatively associated with the piston therein for sustaining the vehicle load.

11. In a motor vehicle, the combination with a vehicle frame, of a housing supported on said frame, a shaft journalled in said housing, a driving road wheel supporting arm carried by said shaft and extending substantially horizontally therefrom, said housing being formed to provide cylinders on either side of said shaft, that cylinder adjacent the wheel supporting arm extending downwardly to afford clearance for driving connections to said road wheel, pistons within said cylinders operable by said shaft, fluid connections between said cylinders, coil springs within said downwardly extending cylinder operable by said piston, said springs affording the sole yielding support for that portion of the vehicle load carried by said road wheel.

12. In a motor vehicle, the combination with a vehicle frame, of a steerable road wheel, a steering knuckle constituting a housing supported for swinging movement on said frame, means for supporting said road wheel on said housing for movement with respect thereto in a substantially vertical plane, and means within said housing and operatively connected with said last named means for yieldingly resisting such vertical movement, said housing extending both forwardly and rearwardly of the point of support therefor on said frame.

13. In a motor vehicle, the combination with a vehicle frame, of an independently sprung road wheel, and means for supporting said road wheel on said frame, said means comprising a housing carried by said frame and having opposed, substantially horizontal cylinders therein, pistons operable in said cylinders, actuating means for said pistons associated with said road wheel, a restricted fluid passage between said cylinders, and sets of coil springs, one within each cylinder, both sets of springs acting to resist movement of said actuating means and pistons in one direction to carry the vehicle load.

14. In a motor vehicle, the combination with a vehicle frame, of a road wheel, and means for yieldingly supporting said road wheel on said frame for substantially vertical movement with respect thereto, said means comprising a housing carried by said frame, said housing being formed to provide a fluid supply chamber and opposed fluid cylinders extending outwardly from said supply chamber, pistons operable in said cylinders, actuating means for said pistons rotatably supported in said housing, extending within said supply chamber and operatively connected with said road wheel to support the latter, a restricted passage affording communication between said cylinders to provide therewith a fluid system, means including a one-way valve affording communication between said supply chamber and said fluid system to automatically replenish fluid in the latter, and means affording a passage between said supply chamber and one of said cylinders to bleed air from the latter, said passage terminating adjacent the point of rotatable support for said actuating means to lubricate the latter.

15. In a motor vehicle, the combination with a vehicle frame, of a road wheel, and means for yieldingly supporting said road wheel on said frame for substantially vertical movement with respect thereto, said means comprising a housing carried by said frame, said housing being formed to provide a fluid supply chamber and opposed fluid cylinders extending outwardly from said supply chamber, pistons operable in said cylinders, actuating means for said pistons comprising a substantially horizontal shaft journalled in said housing and operatively connected with said road wheel to support the latter, an arm depending from said shaft and operatively connected with said pistons, yielding means operable by one of said pistons and constituting the sole support for the vehicle load, said shaft being disposed above the pistons and above the normal level of fluid in the supply chamber, and means for delivering oil from said supply chamber to said cylinders.

16. In a combined shock absorber and spring suspension for motor vehicles, the combination with a housing formed to provide a fluid supply chamber constituting a crankcase and opposed cylinders leading from said chamber, of pistons operating within said cylinders, actuating means for said pistons disposed within said supply chamber, means affording restricted communication between said cylinders and forming with the latter a fluid system, means for replenishing the supply of fluid in said system from said supply chamber, a plurality of coil springs in one of said cylinders for resisting movement of the associated piston in one direction, a second passage affording communication between said cylinders, and a manually operable valve controlling fluid flow through said second passage.

17. In a motor vehicle, the combination with a vehicle frame, of a housing carried by said frame, a longitudinally extending arm for supporting a road wheel, a shaft supporting said arm and journalled in said housing for rotation about a substantially horizontal axis, said housing being formed to provide opposed fluid cylinders disposed on either side of said arm supporting shaft, pistons operable in said cylinders by said arm supporting shaft, that cylinder remote from said arm being of substantially greater capacity than the opposed cylinder, and coil springs located in said remote cylinder and operable by the piston therein to afford the principal support for the vehicle load.

18. In a motor vehicle, the combination with a vehicle frame, of a road wheel, and means for yieldingly supporting said road wheel on said frame for substantially vertical movement with respect thereto, said means comprising a housing carried by said frame, said housing being formed to provide a fluid supply chamber and fluid cylinders extending outwardly from said supply chamber, pistons operable in said cylinders, actuating means for said pistons comprising a substantially horizontal shaft journalled in said housing and operatively connected with said road wheel to support the latter, an arm depending from said shaft and operatively connected with said pistons, yielding means operable by one of said pistons and acting to sustain the vehicle load, said shaft being disposed above the pistons and above the normal level of fluid in the supply chamber, and means for delivering oil from said supply chamber to said cylinders.

19. In a motor vehicle, the combination with a vehicle frame, of a housing supported on said frame, a shaft journalled in said housing, a road wheel supporting arm carried by said shaft and extending substantially horizontally therefrom, said housing being formed to provide cylinders on either side of said shaft, that cylinder adjacent the wheel supporting arm having the axis thereof disposed at an acute angle with respect to said arm, a shock absorbing piston within at least one of said cylinders operable by said shaft, and springs within said angularly disposed cylinder for sustaining the vehicle load.

20. In a motor vehicle, the combination with a vehicle frame, of a housing supported on said frame, a shaft journalled in said housing, a road wheel supporting arm carried by said shaft, said housing being formed to provide at least two cylinders having the axes thereof disposed at an obtuse angle, and spring means within at least one of said cylinders operatively connected with said shaft to resist movement of the latter.

21. In a motor vehicle, the combination with a vehicle frame, of a housing supported on said frame, a shaft journalled in said housing, a road wheel supporting arm carried by said shaft, said housing being formed to provide at least two cylinders having the axes thereof disposed at an obtuse angle, spring means disposed within one of said cylinders and operatively connected with said shaft, said spring means affording the principal means of support for the load transmitted to said road wheel, and a piston disposed in the other of said cylinders and operable by said shaft to absorb shock.

22. In a motor vehicle, the combination with a vehicle frame, of a casing supported on said frame, a shaft journalled in said casing, a road wheel supporting arm carried by said shaft, said casing being formed to provide a cylinder and a tubular spring housing, said cylinder and housing having the axes thereof disposed at an obtuse angle, spring means disposed within said housing and operatively connected with said shaft, said spring means affording the principal means of support for the load transmitted to said road wheel, and a piston disposed in said cylinder and operable by said shaft to absorb shock.

JOHN M. CHRISTMAN.